United States Patent [19]
Welch et al.

[11] Patent Number: 5,764,202
[45] Date of Patent: Jun. 9, 1998

[54] SUPPRESSING IMAGE BREAKUP IN HELMUT MOUNTED DISPLAYS WHICH USE TEMPORALLY SEPARATED BIT PLANES TO ACHIEVE GREY SCALE

[75] Inventors: Brian L. Welch, Baie D'Urfé; Andrew Fernie, Montreal, both of Canada

[73] Assignee: CAE Electronics Ltd., Montreal, Canada

[21] Appl. No.: 593,842

[22] Filed: Jan. 30, 1996

Related U.S. Application Data

[63] Continuation-in-part of Ser. No. 494,822, Jun. 26, 1995, Pat. No. 5,684,498.

[51] Int. Cl.[6] .................................................. G09G 5/00
[52] U.S. Cl. ........................... 345/8; 345/7; 345/150; 359/13; 359/630
[58] Field of Search ................................. 345/150, 7, 8, 345/32, 147, 148; 359/13, 630

[56] References Cited

U.S. PATENT DOCUMENTS

| | | | |
|---|---|---|---|
| 4,349,815 | 9/1982 | Spooner | 345/8 |
| 5,369,450 | 11/1994 | Haseltine et al. | |
| 5,422,653 | 6/1995 | Maguire, Jr. | |
| 5,424,556 | 6/1995 | Symosek et al. | 345/8 |
| 5,446,834 | 8/1995 | Deering | |
| 5,574,473 | 11/1996 | Sekiguchi | 345/32 |
| 5,579,026 | 11/1996 | Tabata | 345/8 |

FOREIGN PATENT DOCUMENTS

| | | |
|---|---|---|
| 0 502 643 A2 | 9/1992 | European Pat. Off. |
| 0 709 816A2 | 5/1996 | European Pat. Off. |
| WO 94/09472 | 4/1994 | WIPO |

OTHER PUBLICATIONS

B. Welch et al, "HDTV virtual reality" pp. 407–410.

Primary Examiner—Richard Hjerpe
Assistant Examiner—Kent Chang
Attorney, Agent, or Firm—Fishman, Dionne, Cantor & Colburn

[57] ABSTRACT

For displaying moving images on a head mounted, temporal modulation display device from a video source, without image break-up appearing in the observed image, an image shift device is provided for shifting each temporally separated component image within each display cycle of grey scale component images representing each frame of the video source. The display device is for use with head mounted displays in which an LCD or other FPD using temporal modulation is used to display video images without image break-up during head motion.

9 Claims, 2 Drawing Sheets

TYPICAL TIMING DIAGRAM FOR A 6 BIT TEMPORAL MODULATION SCHEME.

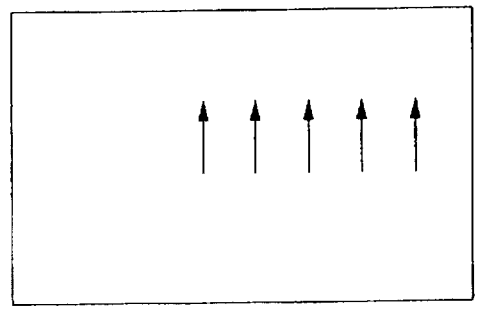
MOTION OF OBJECT ON DISPLAY
FIG_1
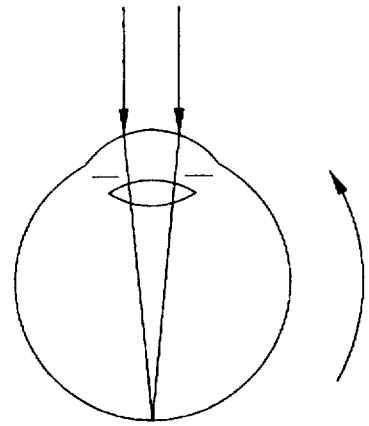
IMAGE OF OBJECT FOCUSSED
ON RETINA AT OR NEAR FOVEA
FIG_2
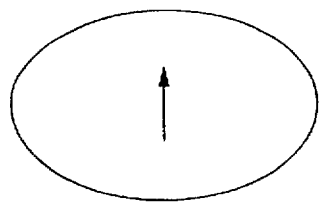
ALL IMAGES
SUPERIMPOSED
FIG_3a
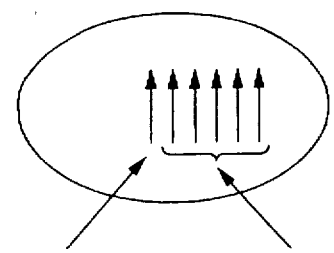
MOST SIGNIFICANT
BIT PLANE IMAGE
REMAINING BIT
PLANE IMAGES
FIG_3b

TYPICAL TIMING DIAGRAM FOR A 6 BIT TEMPORAL MODULATION SCHEME.

SUPPRESSING IMAGE BREAKUP IN HELMUT MOUNTED DISPLAYS WHICH USE TEMPORALLY SEPARATED BIT PLANES TO ACHIEVE GREY SCALE

This application is a continuation-in-part of U.S. patent application Ser. No. 08/494,822 filed Jun. 26, 1995, now U.S. Pat. No. 5,684,498.

BACKGROUND OF THE INVENTION

Television Display devices such as the Digital Micromirror Device (DMD's), Active Matrix Electroluminescent Displays (AMEL's) and Ferro Electric Liquid Crystal Displays (FELCD's) achieve a grey scale varying from white to black by switching each pixel on for a specific amount of time during each field or frame. As the human eye has an integration time which is much longer than the time for each field (usually ⅙₀ sec in the U.S.), it perceives a constant brightness proportional to the amount of time the pixel is turned on during each field period. This is achieved by dividing each field time, nominally 16.67 milliseconds in the U.S., into bit planes representing each bit of the binary number which specifies the relative brightness of each pixel.

A typical system for example would have the most significant bit turned on for 4 milliseconds, the next most significant bit turned on for 2 milliseconds and so on in a binary scale for the remainder of the bits. A high quality image may require eight or even nine bit planes while other systems may use as little as five or six bit planes. The intervals between each bit plane are usually used for addressing each pixel in the display with the illumination source turned off. Some schemes however keep the illumination source turned on for the complete field and addressing of each pixel for each bit plane takes place within the bit plane periods.

All schemes however have one thing in common in that the same image is used to refresh each bit plane during the course of a specific field. This can cause annoying artifacts with moving imagery. The effect is most noticeable on helmet mounted displays during moderate to rapid head motion where discrete objects tend to break up into double or multiple images or may appear to jitter or be smeared.

Suppressing image break up in a field sequential color video display is disclosed in U.S. patent application Ser. No. 08/494,822, the specification of which is hereby incorporated by reference.

SUMMARY OF THE INVENTION

It is an object of the present invention to provide a method and apparatus for reducing image breakup in television display devices which create a grey scale by the use of temporally separated bit planes. The technique is often known as temporal modulation or pulse width modulation. As is known in the art, image breakup occurs in moving television imagery whenever the update rate of the image and the refresh rate of display are not identical and synchronous. This invention largely reduces such image breakup in helmet mounted displays by using the angular velocity of the head to generate small vertical and horizontal offsets for each bit plane. The observer thereby sees each bit plane image as if it had been updated for the new head position and image breakup, smear etc. are largely eliminated.

According to the invention, there is provided a head-mounted display device having temporal modulation grey scale for use in displaying an image of an environment comprising: an image generator for generating images; temporal modulation means for separating the images into a plurality of component images to be displayed sequentially to provide an observer with an impression of grey scale images; means for determining an angular velocity of a head of the observer and for generating a head velocity signal; and image shift means for shifting on the screen the component images with respect to one another as a function of the velocity signal, whereby image break-up in the display device is suppressed.

The invention also provides a method for displaying a video signal on a head mounted, temporal modulation grey scale display device for use in displaying an image of an environment comprising the steps of: generating temporal modulation component images from the video signal; sequentially displaying the component images on the display device such that a mixing of the component images as seen by an observer results in the appearance of a normal grey scale image; determining an angular velocity of a head of the observer; and shifting the component images with respect to one another as a function of the velocity to suppress image break-up in the display device.

BRIEF DESCRIPTION OF THE DRAWINGS

The invention will be better understood by way of the following detailed descriptions of a preferred embodiment of the invention with reference to the appended drawings in which:

FIG. 1 illustrates a series of 5 objects within an image being displayed to create the illusion of object motion from right to left as is known in the art;

FIG. 2 illustrates a cross-section of an observer's eyeball illustrating schematically the image formed on the retina and the direction of rotation of the eye as an object is tracked during motion as illustrated in FIG. 2;

FIGS. 3a and 3b illustrate respectively in schematic format the image appearing on the observer's retina for temporally separated grey scale display;

DETAILED DESCRIPTION OF THE PREFERRED EMBODIMENTS

In order to understand the invention, it is first necessary to have a clear understanding of why image break-up occurs. As is well known in the art, television creates the illusion of smooth motion by drawing successive images at a sufficient fast rate that the human visual system can no longer see the individual images (i.e. the image is flicker-free). If the entire image or the objects within the image are moved appropriately relative to the previous image, the visual system will interpret the sequence of images as smooth motion. FIG. 1 shows the motion of an understanding arrow on a display moving from right to left in five successive images. The arrow represents any fixed object within the scene being displayed. In order to fixate on this object, the eye makes what is known as a "smooth pursuit eye movement" in the same way as it would if looking at a real object moving in the real world. Even though the image appears at a finite number of discrete locations, the eye will move or rotate with a substantially constant velocity to track the object. The rotating eye is illustrated in FIG. 2. It will be noted that all of the consecutive images are focused on the retina at or near the fovea allowing the observer to see a single image as shown in FIG. 3a. If however the display uses temporal modulation as described earlier and also illustrated in FIG. 4 the eye would normally track the images created in the most significant bit plane and the images created in the remaining bit planes would be focused at different points on the retina as shown in FIG. 3b.

The separation of the images will be proportional to the rotational velocity of the eye and the time differences between the bit planes. If all the bit planes are on and the motion is sufficiently slow separation will not be apparent but the image will appear to be smeared. If the bit planes are changing during the motion, especially if the most significant bits are changing, the observer will perceive the object to have jitter.

In the case of a head mounted display, head rotation will cause an equal and opposite motion of the image across the display. The observers eye is still able to track specific objects within the image being displayed and sees the effects described above.

The objective of this invention is to compute the amount of separation which would occur based on the rotational head velocity of the observer and shift the entire image on the display an appropriate amount for each bit plane so that all the bit plane images in a single field are coincident on the retina. The observer will thus see a normal image; the effects described above being either eliminated or much reduced.

Figure 4:
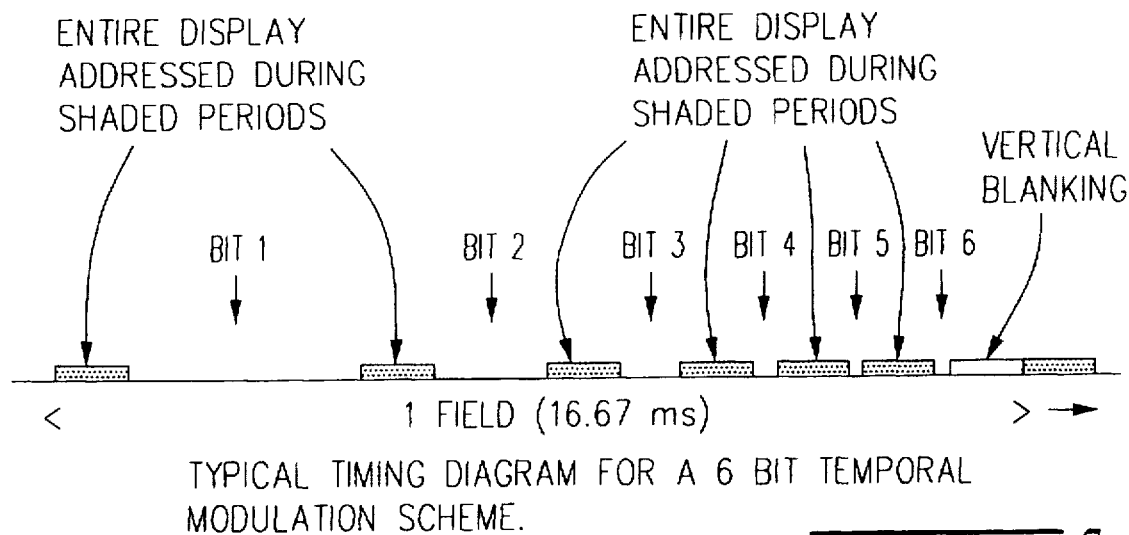
FIG. 4 shows a typical timing diagram for a single field divided into six bit planes.
Figure 5:
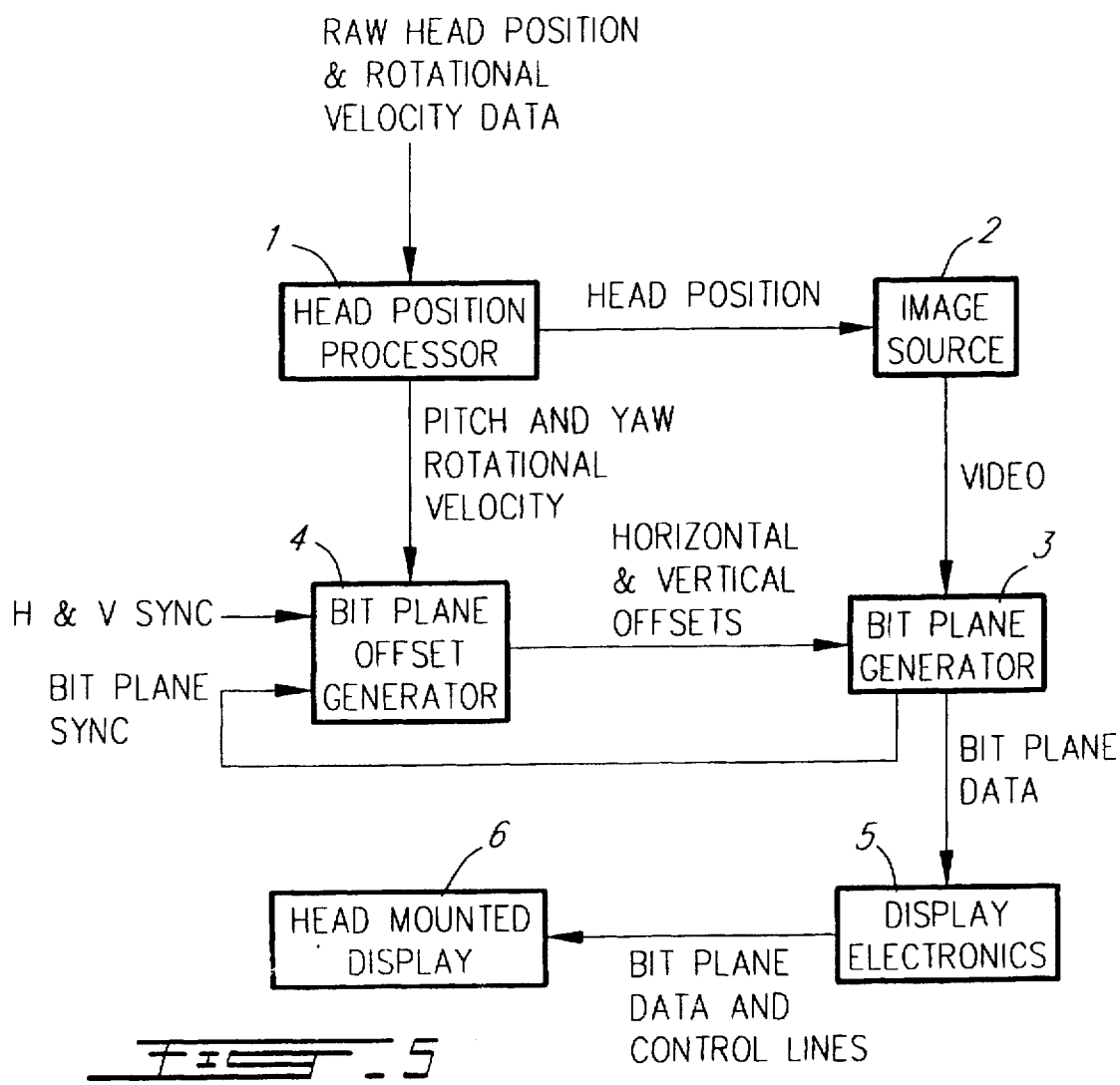
FIG. 5 is a block diagram of the apparatus according to the preferred embodiment.

FIG. 5 is a schematic of the preferred embodiment and shows how the corrected display data is obtained. The head position processor 1 receives the raw head position data from a head tracking device such as a Polemus Magnetic tracker as well or head rotational velocity data from a device such as the Watson C341 rate sensor. Rotational acceleration data may also be included. The head position processor sends either predicted head position as suggested by UWE LIST or current head position to the image source 2 which may be an image sensor such as a television camera mounted on a gimbal system or a computer image generator. The video signal from the image source is sent to the Bit Plane Generator 3 which stores a complete field in a digital format, generates the timing waveforms for the particular temporal modulation scheme being used (a typical one is shown in FIG. 4) and sends the bit plane data during the appropriate intervals to the Display Electronics module 5 which drives the head mounted display 6. The Bit Plane offset Generator 4 receives timing signals (H&V) from the image source, a bit plane sync from the bit plane generator and angular head velocity data from the head position processor. It generates H&V offsets for each bit plane except the most significant bit plane according to the formulas below:

$$Ho = \frac{xt}{Kh}$$

$$Vo = \frac{vt}{Kv}$$

where: Ho=Horizontal offset in pixels
Vo=Vertical offset in pixels
x=Angular yaw velocity of the head in degrees/sec.
y=Angular pitch velocity of the head in degree/sec.
Kh=Is a constant for the display giving the angular subtense between centres of adjacent pixels in the horizontal direction in degrees/pixel.
Kv=is a similar constant giving the angular subtense between centres of adjacent pixels in the vertical direction in degrees/pixel.

t=the interval in time between the centre of the most significant bit plane and the bit plane being processed (in seconds).

We claim:

1. A head-mounted display device having temporal modulation grey scale for use in displaying an image of an environment comprising:

an image generator for generating images;

temporal modulation means for separating said images into a plurality of component images to be displayed sequentially to provide an observer with an impression of grey scale images;

means for determining an angular velocity of a head of said observer and for generating a head velocity signal; and image shift means for shifting on said screen said component images with respect to one another as a function of said velocity signal, whereby image breakup in said display device is suppressed.

2. The display device as claimed in claim 1, wherein the image shift means comprise a processor being fed a sync signal and said velocity signal for generating vertical and horizontal offset signals for said screen when displaying said component images.

3. The display device as claimed in claim 1, wherein said image shift means comprise a relay mirror having an angular orientation with respect to said screen which is adjustable by transducer means.

4. The display device as claimed in claim 3, wherein the image shift means comprise a processor being fed a sync signal and said velocity signal for generating vertical and horizontal offset signals for said transducer means when displaying said component images.

5. The display device as claimed in claim 4, wherein said offset signals vary continuously over each field to compensate for delay in image presentation due to vertical scan time.

6. The display device as claimed in claim 1, wherein said screen is a digital display, said image shift means comprising vertical and horizontal digital image shift circuits.

7. A method for displaying a video signal on a head mounted, temporal modulation grey scale display device for use in displaying an image of an environment comprising the steps of:

generating temporal modulation component images from said video signal;

sequentially displaying said component images on said display device such that a mixing of said component images as seen by an observer results in the appearance of a normal grey scale image;

determining an angular velocity of a head of said observer; and shifting said component images with respect to one another as a function of said velocity to suppress image break-up in said display device.

8. The method as claimed in claim 7, wherein said step of shifting comprises adjusting an angular position of a mirror.

9. The method as claimed in claim 8, wherein said velocity comprises head pitch, roll and yaw rate data.

* * * * *